United States Patent [19]

Gautier et al.

[11] Patent Number: 4,668,313
[45] Date of Patent: May 26, 1987

[54] POLYMER WITH ETHYLENIC UNSATURATIONS INCORPORATING SILYLMETALLOCENE GROUPS, PROCESS FOR THE MANUFACTURE OF THIS POLYMER, AND PROPELLANT COMPOSITION HAVING THIS POLYMER AS A BINDER

[75] Inventors: Jean-Claude C. Gautier, Ablon sur Seine; Michel H. Fontanille, Montmorency; Serge F. Raynal, Draveil, all of France

[73] Assignee: Societe Nationale des Poudres et Explosifs, Paris, France

[21] Appl. No.: 879,404

[22] Filed: Jun. 27, 1986

Related U.S. Application Data

[62] Division of Ser. No. 750,076, Jun. 28, 1985.

[30] Foreign Application Priority Data

Jul. 20, 1984 [FR] France ................................ 84 11507

[51] Int. Cl.$^4$ ............................................. C06B 45/10
[52] U.S. Cl. ................................. 149/19.2; 149/19.91; 525/342
[58] Field of Search ........................... 149/19.2, 19.91; 525/342

[56] References Cited

U.S. PATENT DOCUMENTS

| | | | |
|---|---|---|---|
| 3,471,440 | 10/1969 | Ashby | 525/342 |
| 3,767,488 | 10/1973 | Seals | 149/19.2 |
| 3,867,213 | 2/1975 | Stevens et al. | 149/19.2 |
| 4,019,932 | 4/1977 | Schroeder | 149/19.2 |
| 4,060,435 | 11/1977 | Schroeder | 149/19.2 |
| 4,115,635 | 9/1978 | Blount | 525/342 |
| 4,230,815 | 10/1980 | Itoh et al. | 525/333.2 |
| 4,332,631 | 6/1982 | Herty, III et al. | 149/19.2 |
| 4,385,134 | 5/1983 | Fosconte et al. | 525/342 |
| 4,405,754 | 9/1983 | Moczygamba et al. | 525/342 |
| 4,524,187 | 6/1985 | Greco et al. | 525/332.1 |

*Primary Examiner*—Joseph L. Schofer
*Assistant Examiner*—Bernard Lipman
*Attorney, Agent, or Firm*—Cushman, Darby & Cushman

[57] ABSTRACT

The invention relates to a polymer with ethylenic unsaturations incorporating silylmetallocene groups, a process for the manufacture of these polymers and a propellant composition having the polymer of the invention as a binder.

The polymer of the invention incorporates ethylenic unsaturations, to at least some of which there are added silylmetallocene groups of formula

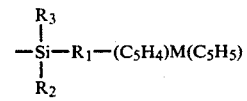

in which M denotes a transition metal such as, for example, iron, the radicals $R_1$, $R_2$ and $R_3$ being hydrocarbon radicals. The polymer may be a hydroxytelechelic or carboxytelechelic polybutadiene. This modified polymer is employed as a binder in composite propellant compositions, thus making it possible to solve the problem related to the migration of the combustion catalyst.

The invention has application particularly in the field of solid propulsion.

11 Claims, No Drawings

POLYMER WITH ETHYLENIC UNSATURATIONS INCORPORATING SILYLMETALLOCENE GROUPS, PROCESS FOR THE MANUFACTURE OF THIS POLYMER, AND PROPELLANT COMPOSITION HAVING THIS POLYMER AS A BINDER

This is a division of application Ser. No. 750,076, filed June 28, 1985.

The present invention relates to polymers incorporating ethylenic unsaturations, to at least some of which there are added silylmetallocene groups, a process for the manufacture of these polymers, and a solid propellant composition, the binder of which consists at least partly of at least one of these polymers.

The subject of the invention is more particularly a polymer incorporating vinyl-type unsaturations attached to the polymer chain and functional end groups, metallocene groups being added to at least a part of the unsaturations via silane-type bonds.

Metallocene compounds, and particularly ferrocenes, have been employed for a very long time as combustion catalysts in propellant compositions. However, since these compounds are merely mixed with the propellant composition, they tend to migrate towards the surface of the block during aging. This migration produces a ferrocene concentration gradient in the block, which gives rise to irregularities in its combustion and, furthermore, can affect the adhesion of the inhibitor to the propellant.

Many solutions have been proposed to reduce or eliminate ferrocene migration in solid propellant compositions. One of these solutions consists in modifying the ferrocene molecule by adding isocyanate or hydroxy groups to the latter, these groups subsequently reacting with the end groups of the polymer, for example the hydroxy or carboxy groups of a hydroxytelechelic or carboxytelechelic polybutadiene.

This solution is described, in particular, in U.S. Pat. Nos. 3,932,240 and 3,843,700. Thus, ferrocene compounds which are chemically bonded to the polymer no longer migrate in the propellant composition. However, this solution has two major disadvantages. In effect, either it makes it possible to incorporate only a very small quantity of ferrocene in the composition, given that the number of free end groups in the crosslinked polymer is very small in relation to the mass of this polymer, or, when the ferrocene is attached to the prepolymer, it causes a significant reduction in the number of end groups, and does not make it possible to produce a polymerized composition having suitable mechanical properties.

It has also been proposed to produce a polymer obtained by polymerization of a ferrocene compound, such as vinylferrocene, with butadiene, to give a polymer with carboxy end groups. This solution does not make it possible to incorporate a sufficient quantity of iron, if the polymerized composition is intended to retain adequate mechanical properties.

Finally, in another solution, illustrated by U.S. Pat. No. 4,023,994, it has been proposed to attach the ferrocene to the plasticizer added to the propellant composition. However, this process does not eliminate the migration of the combustion catalyst in the propellant composition.

The aim of the invention is to overcome all these disadvantages by offering a polymer incorporating metallocene groups, and particularly ferrocene groups, attached to its chain without the polymer end groups being affected; as a consequence, the mechanical characteristics of the crosslinked polymer will be only slightly affected, or not at all. The quantity of metallocene or the metal content of the polymer obtained is high, and makes it possible to produce a propellant composition having this polymer as a binder and having a suitable metal content for obtaining high combustion velocities.

To this end, the polymer proposed by the invention incorporates ethylenic unsaturations, to at least some of which there are added groups of the following formula (I):

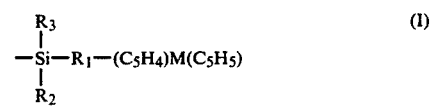

in which:
M denotes a transition metal chosen from the group comprising iron, osmium, ruthenium, nickel, cobalt, manganese and titanium;
$R_1$ denotes a substituted or unsubstituted aliphatic residue or a substituted or unsubstituted aromatic residue;
$R_2$ and $R_3$, which may be different or identical, denote a substituted or unsubstituted aliphatic residue, a substituted or unsubstituted aromatic residue, or a group $-[R_1-(C_5H_4)M(C_5H_5)]$.

The groups of formula (I) are called "silylmetallocene groups".

According to another characteristic of the invention, at least some of the ethylenic unsaturations which the polymer contains are of the vinyl type, the silylmetallocene groups being preferably added to at least a part of these vinyl-type unsaturations.

The vinyl-type unsaturations are carried either by the carbons of the polymer chain, or are present in substituents carried by the carbons of the polymer chain, these substituents being hydrocarbon compounds containing from 1 to 10 carbon atoms.

Advantageously, the vinyl-type unsaturations are carried by the carbon atoms forming the polymer chain, the end carbon atoms carrying functional groups.

Thus, the silylmetallocene groups are added only to the pendent vinyl-type unsaturations, and do not react with the end functional groups of the polymer. This polymer can, as a result of this, be crosslinked through the intermediacy of its end functional groups and also via the ethylenic unsaturations which are not saturated by the silylmetallocene groups.

However, according to the invention, if desired, it is possible to add the silylmetallocene groups to the ethylenic unsaturations present in the polymer chain. In this case, depending on the nature of the polymer end groups, silylmetallocene groups will be capable of reacting with these end groups. This is the case when these end groups are hydroxy or carboxy groups or vinyl-type unsaturations, for example.

As a result, the polymers which are suitable for the invention are polymers containing ethylenic unsaturations in their chain, and/or pendent or end vinyl-type unsaturations, with or without functional end groups. As an example of polymers which are suitable for the invention which may be mentioned is the polymers obtained by polymerisation or copolymerisation of diene compounds such as, for example, polybutadienes or polyisoprenes, the unsaturated polymers obtained by condensation.

The polymers which are suitable for the preferred embodiment of the invention are polymers containing ethylenic unsaturations, at least some of which are of the vinyl type and are pendent relative to the polymer chain. Such polymers are obtained by polymerization or copolymerization of diene compounds, such as 1,2- and 1,4-polymerized polybutadienes, and 1,2-, 3,4- and 1,4-polymerized polyisoprenes.

Advantageously, these polymers have functional end groups, for example hydroxy or carboxy groups.

The preferred polymers of the invention are hydroxytelechelic or carboxytelechelic polybutadienes containing vinyl-type unsaturations.

The silylmetallocene groups are added to the required number of vinyl-type unsaturations present in the polymer. Thus, these groups may be added to all the vinyl-type unsaturations, the end functional groups of the polymer being unaffected. The functional groups in the polymer, for example the hydroxy groups of a hydroxytelechelic polybutadiene or the carboxy group of a carboxytelechelic poybutadiene, do not react with the silylmetallocene groups and are therefore free to take part in the crosslinking of the polymer in the presence of a crosslinking agent such as a polyisocyanate or a polyepoxide.

The preferred silylmetallocene groups of the invention are the silylferrocene groups of formula I with M denoting the iron atom.

The radicals $R_2$ and $R_3$ are preferably methyl or ethyl radicals or the group $—[R_1—(C_5H_4)Fe(C_5H_5)]$.

The radical $R_1$ may be a substituted or unsubstituted methylenic chain or a phenylene, benzylidene or benzylene radical.

In the preferred embodiment of the invention, the radical $R_1$ denotes a methylenic chain of the formula $(CH_2)_n$, in which n is between 1 and 6.

These polymers containing silylmetallocene groups may be employed in many applications and, in particular, to form partly or wholly the binder of a solid propellant composition, this application being another subject of the present invention.

In effect, the propellants known as composite propellants consist essentially of an inert binder such as, for example, a polymer based on hydroxytelechelic polybutadiene (HTPB) or carboxytelechelic polybutadiene (CTPB) crosslinked with a polyisocyanate or a polyepoxide, an oxidizing agent, in most cases an inorganic oxidizing agent such as ammonium perchlorate, for example, and, if appropriate, a fuel such as, for example, aluminium.

The composite propellants also contain many additives such as plasticizers, antioxidants, polymerization catalysts, and combustion catalysts. Metallocenes and, preferably, ferrocenes are generally employed as combustion catalysts.

In the propellant composition according to the invention, the composite propellant comprises the same components as those described above and currently employed. However, the inert binder consists wholly or partly of a polymer according to the invention, bearing silylmetallocene groups.

As a result of this, it is no longer necessary to add a combustion catalyst to the propellant composition, the former being attached directly to the polymer.

Furthermore, the polymer according to the invention is crosslinked with a crosslinking system identical to that employed to crosslink conventional polymers. Thus, for a hydroxytelechelic polybutadiene bearing silylmetallocene groups, the crosslinking agent is a polyisocyanate, such as toluene diisocyanate, isophorone diisocyanate, hexamethylene diisocyanate, trimethylhexane diisocyanate or methyldicyclohexyl diisocyanate, for example. Similarly, for a carboxytelechelic polybutadiene according to the invention, the crosslinking agent is a polyepoxide, for example Epon 812 marketed by Shell, or a polyaziridine, for example tris(2-methyl-1-aziridinyl)phosphine oxide (MAPO).

The proportion of combustion catalyst in the propellant, which is generally expressed as the proportion of metal, for example as the proportion of iron, in its composition, may be controlled via, on the one hand, the quantity of polymer present in the propellant and, on the other hand, the number of silylmetallocene groups attached to each polymer molecule. In addition, it is generally possible to increase the metal content by attaching silylmetallocene groups containing radicals $R_2$ and $R_3$ denoting the group $—[R_1—(C_5H_4)M(C_5H_5)]$. It is thus possible to obtain HTPB polymers containing from approximately 3% to approximately 15% by weight of metal, and propellants containing, approximately, from 0.2% to 4% by weight of metal.

As will be illustrated by the following examples, the mechanical properties of the propellants according to the invention are suitable and of the same order as those of a propellant produced with a conventional polymer.

Furthermore, the combustion characteristics of these compositions, both from the standpoint of combustion velocity and from that of the pressure exponent, are of the same order as those of composite propellants with a binder consisting of conventional polymers and for an equivalent proportion of metal, for example iron, the metal being contributed by the addition of combustion catalysts to the composite propellants of the prior art.

Lastly, the phenomenon of yellowing of the faces of the block of propellant or of the inhibitor layer applied to the block of propellant, caused by migration of the combustion catalyst, is no longer observed in the propellant compositions of the invention. This observation demonstrates one of the important results of the invention, namely the fixation of the combustion catalyst in the propellant composition, which takes place without appreciable change in the mechanical properties of the composition or of its combustion characteristics.

Furthermore, the propellants according to the invention are produced by a conventional manufacturing process similar to that employed for the manufacture of composite propellants containing a polymer binder which does not incorporate silylmetallocene groups. This process is illustrated in the examples below.

The present invention also offers a process for the manufacture of the polymers according to the invention.

In a first step, this process consists in reacting, in the presence of a hydrosilylation catalyst, a polymer incorporating ethylenic unsaturations, with a silylmetallocene compound of the following formula:

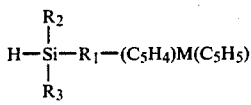

in which $R_1$, $R_2$, $R_3$ and M have the same meanings as in the formula (I) shown earlier; then, in a second step, in precipitating the resultant polymer by adding to the reaction medium a compound or mixture of compounds which does not dissolve the said resultant polymer; and, in a third step, in separating and recovering the resultant polymer by, for example, gravity separation, filtration, centrifuging, or by any other appropriate separation process.

The hydrosilylation catalysts which are suitable for the invention are peroxides, platinum, hexachloroplatinic acid ($H_2PtCl_6.6H_2O$), metal carbonyls, such as cobalt carbonyl, nickel carbonyl and similar. The preferred catalyst of the invention is hexachloroplatinic acid.

The compounds or mixture of compounds which are suitable for precipitating the polymer produced by the reaction in the first step are methanol, ethanol, acetone, a mixture of acetone and ethanol, or any other compound or mixture which does not dissolve the converted polymer, but which is a solvent for the starting materials and the catalyst.

The first step may be carried out in a heterogeneous medium and without a solvent, or in a homogeneous medium by adding to the starting materials a solvent or mixture of solvents which is common to the polymer and to the silylmetallocene.

The preferred solvents of the invention are tetrahydrofuran, benzene, toluene, hexane and carbon tetrachloride.

The reaction is carried out at a temperature of between approximately −5° C. and approximately 90° C., depending on the solvent employed and the required degree of conversion of the double bonds.

The quantity of silylmetallocene employed corresponds to the stoichiometric quantity necessary to convert the required number of double bonds. Advantageously, an approximately 10% excess of silylmetallocene is added, relative to the stoichiometric quantity.

The above conditions correspond to the preferred embodiment of the invention and make it possible to add the silylmetallocene groups chiefly to the vinyl-type double bonds without a reaction with the end functional groups, and without producing a crosslinking or a bridging which would increase the molecular weight of the prepolymer and hence its viscosity.

According to the invention, it is also possible to add silylmetallocene groups to the double bonds present in the prepolymer chain by conducting the reaction at temperatures above 90° C. or by the choice of catalyst, of the concentration of the latter in the reaction medium and of the reaction time.

To extract the modified prepolymer from the reaction medium, in the preferred embodiment of the invention, the prepolymer is precipitated by adding the reaction medium to a mixture of acetone and methanol. The precipitate is recovered by gravity separation and centrifuging. It is also possible to add the mixture of acetone and methanol to the reaction medium.

The residual solvent is advantageously evaporated off by evaporation under vacuum.

The silylmetallocene compounds of formula (II) may be obtained by various processes, particularly by the processes described in French Patent Nos. 1,398,255 and 1,456,277, or by the process described in French Patent Application No. 84/11,506 by the Applicant Company which corresponds to U.S. application Ser. No. 749,803, Gautier et al, PI/B.790, filed concurrently with Ser. No. 750,076 and incorporated by reference.

The examples below, given solely by way of indication, illustrate the invention more clearly. In these examples, the symbol Fc denotes the radical $(C_5H_5)Fe(C_5H_4)$.

EXAMPLE 1

Preparation of a hydroxytelechelic polybutadiene prepolymer bearing dimethylsilyltetramethyleneferrocene groups.

50 g of a hydroxytelechelic polybutadiene prepolymer marketed by Arco under the name "R 45M", this polymer having a glass transition temperature of −80° C., are added to 1.8 liters of dry hexane (28 g/liter of prepolymer).

The mixture is heated with stirring at 60° C. and then 1 ml of an alcoholic solution of hexachloroplatinic acid is added.

15 g of

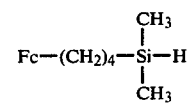

dissolved in 20 ml of hexane are then added, representing the theoretical quantity for saturating 15% of the total unsaturations in the prepolymer, to which an excess of the other 10% has been added.

The temperature is maintained at 60° C. for 24 hours and then the mixture is cooled to ambient temperature.

The reaction medium is added to a mixture of acetone and methanol to precipitate the modified prepolymer. The latter is then recovered by gravity separation and centrifuging.

The progress of the hydrosilylation reaction is followed by infrared spectral analysis, and particularly by the disappearance of the band at 2,100 cm$^{-1}$ corresponding to the Si-H bond.

The degree of conversion of the double bonds in the prepolymer is determined by assaying the grafted ferrocene. This is done by NMR analysis by adding a standard, for example benzene, to the modified polymer and comparing the respective peaks of benzene and of the grafted ferrocene.

In the example below it can be seen that 11.1% of the double bonds have been modified, which corresponds to a yield of 74% based on the silylferrocene compound employed.

NMR analysis also shows that in the example below approximately 56% of the vinyl-type double bonds have been modified, while only approximately 1% of the ethylenic (diene) double bonds have been saturated.

In addition, gel permeation chromatography analysis shows that no bridging reaction has taken place when the prepolymer was modified.

Moreover, the assay of the end hydroxy groups in the modified prepolymer indicates that its functionality (approximately 2.3) is substantially equal to that of the starting prepolymer.

Furthermore, the glass transition temperature of the modified prepolymer is of the order of −60° C.

EXAMPLE 2

By following the same procedure as in Example 1 and with the same starting materials, but adding only 10.5 g of:

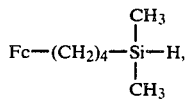

representing the theoretical quantity for producing a 10% conversion of the total unsaturations in the HTPB polymer, a modified prepolymer was obtained having 7.7% of its double bonds saturated (38% of the vinyl bonds and 0.5% of the ethylenic bonds), which corresponds to a yield of 77% based on the silylferrocene compound employed.

The glass transition temperature of this modified prepolymer is −65° C.

EXAMPLE 3

The operations in Example 1 are repeated, but using 100 g of hydroxytelechelic polybutadiene prepolymer and 150 g of

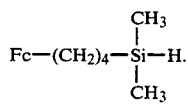

This quantity of silylferrocene makes it possible to saturate all of the vinyl-type bonds in the prepolymer and thus to obtain a proportion of iron of 9.9% in the polymer.

Analysis of the polymer obtained shows that 100% of the vinyl bonds have been saturated, while the addition of silylferrocene has occurred in less than 1% of the bonds of the ethylenic type.

The measured iron content in the polymer is 9.6%, which corresponds to a yield of 95% based on the silylferrocene compound employed.

The glass transition temperature of this modified prepolymer is −60° C.

EXAMPLES 4, 5

A modified prepolymer was produced in an identical manner to Examples 1 and 2, with the use of a dimethylsilylbenzylferrocene in place of dimethylsilyltetramethyleneferrocene.

The results obtained, collated in the table below, are similar to those obtained in Examples 1 and 2.

| Proportion of unsaturations modified | | Yield based on | |
|---|---|---|---|
| theoretical % | measured % | silylferrocene | Tg |
| 15% | 10.3% | 72% | −50° C. |
| 10% | 7.7% | 77% | −55° C. |

EXAMPLES 6, 7

By following the same procedure as that described in Example 1, but using the following compounds:

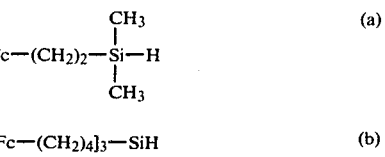

as a silylferrocene, a modified HTPB prepolymer is prepared, with an iron content of 3% by weight.

The modified prepolymers obtained have a glass transition temperature of −71° C. in the case of compound a and −74° C. in the case of compound b.

EXAMPLE 8

A carboxytelechelic polybutadiene prepolymer is prepared, which is modified by grafting:

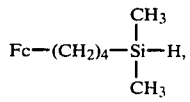

according to an operating procedure identical to that in Example 1.

The proportion of saturated double bonds is of the order of 1.90%.

EXAMPLE 9

The modified prepolymer obtained in Example 1 is employed as a binder in a propellant composition referred to as composite.

Thus, a propellant having the following composition by weight:
modified prepolymer: 13
methyldicyclohexyl diisocyanate: 1.20
ammonium perchlorate: 80
aluminium: 2
dibutyltin dilaurate: 0.20
plasticizer: 3.60
was produced, following the conventional method for preparing propellant compositions, known as a total method.

The iron content in the propellant is 0.94%.

The mechanical properties of the propellant obtained are:
Sm (Mpa): 1
ε: 28%
ρm: 31%
ρr: 33%

Firing tests carried out in a strand burner have shown that the combustion velocity V of this composition is of the same order as that obtained for composite propellants containing a combustion catalyst which is not chemically bound to the polymer. Moreover, as shown by the results collated in Table I below, the pressure exponent n, in the expression $V + aP^n$, is low for the measured values of combustion velocity.

| P (MPa) | V (mm/s) | n |
|---|---|---|
| 3 | 41.7 | 0.44 |
| 7 | 55.9 | |
| 12 | 78.8 | |
| 20 | 92.6 | |

In the above expression, P denotes the combustion pressure, a being the pressure coefficient.

Another important result of the invention is noted visually. In point of fact, in blocks of propellant containing a combustion catalyst which is not bound, the migration of this catalyst was seen as a yellowing of the inhibitor and a non uniform combustion across the cross-section of the block. In a block made using a propellant according to the invention, this ageing phenomenon is no longer observed, which increases the lifetime of these blocks and makes it possible to obtain a combustion velocity which is substantially homogeneous across the cross-section of the block.

What is claimed is:

1. A process for producing a polymer containing ethylenic unsaturations and having fixed to at least some of said ethylenic unsaturations by a hydrosilylation reaction a silylmetallocene group of the formula

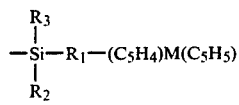

wherein
- M represents a transition metal selected from the group consisting of iron, osmium, ruthenium, nickel, cobalt, manganese and titanium,
- $R_1$ represents a substituted or unsubstituted aliphatic residue, or a substituted or unsubstituted aromatic residue,
- $R_2$ and $R_3$, each independently, represent a substituted or unsubstituted aliphatic residue, a substituted or unsubstituted aromatic residue, or $-[R_1-(C_5H_4)M(C_5H_5)]$, said process comprising (a) reacting, in the presence of a hydrosilylation catalyst, a polymer incorporating ethylenic unsaturations, with a silylmetallocene compound of the formula

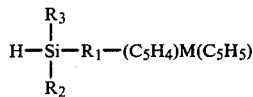

wherein $R_1$, $R_2$, $R_3$ and M have the meanings given above, (b) precipitating the resultant polymer by mixing the reaction medium with a compound or mixture of compounds which is not a solvent for said polymer; and (c) separating the precipitated polymer from the reaction medium.

2. The process of claim 1 which includes in step (a) adding a solvent common to the polymer and to the silylmetallocene compound.

3. The process of claim 2 wherein said common solvent is selected from the group consisting of tetrahydrofuran, benzene, toluene, hexane and carbon tetrachloride.

4. The process of claim 1 wherein the reaction in step (a) is carried out in a heterogeneous medium.

5. The process of claim 1 wherein the reaction in step (a) is carried out at a temperature ranging from $-5°$ C. to $+90°$ C.

6. The process of claim 1 wherein some of the ethylenic unsaturations in the polymer being reacted in step (a) are of the vinyl type, and the number of moles of said silylmetallocene compound being reacted with said polymer is equal to the number of vinyl-type unsaturations present in one mole of said polymer being reacted with said silylmetallocene compound, increased by an excess of approximately 10%.

7. The process of claim 1 wherein said compound or mixture of compounds which is not a solvent for said polymer in step (b) is selected from the group consisting of methanol, ethanol, acetone and a mixture of acetone and methanol.

8. A solid propellant composition comprising an inert binder, an oxidizing agent, a fuel, a plasticizer and ballistic additives, said inert binder comprising at least in part a polymer containing ethylenic unsaturations and having fixed to at least some of said ethylenic unsaturations by a hydrosilylation reaction a silylmetallocene group of the formula

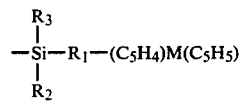

wherein
- M represents a transition metal selected from the group consisting of iron, osmium, ruthenium, nickel, cobalt, manganese and titanium,
- $R_1$ represents a substituted or unsubstituted aliphatic residue, or a substituted or unsubstituted aromatic residue, and
- $R_2$ and $R_3$, each independently, represent a substituted or unsubstituted aliphatic residue, a substituted or unsubstituted aromatic residue, or $-[R_1-(C_5H_4)M(C_5H_5)]$.

9. The solid propellant composition of claim 8 wherein said polymer is a polybutadiene having hydroxy or carboxy end groups, said composition containing from 0.2 to 4 percent by weight of added metal per mole of polymer.

10. The solid propellant composition of claim 9 wherein the inert binder consists solely of said polymer.

11. The solid propellant composition of claim 9 wherein the silylmetallocene groups carried by said polymer are silylferrocene groups, the iron content in said polymer ranging from 3 to 15 percent.

* * * * *